United States Patent
Schepis et al.

(10) Patent No.: US 8,434,126 B1
(45) Date of Patent: Apr. 30, 2013

(54) METHODS AND SYSTEMS FOR AIDING PARENTAL CONTROL POLICY DECISIONS

(75) Inventors: Adam Schepis, Milford, MA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 760 days.

(21) Appl. No.: 12/364,349

(22) Filed: Feb. 2, 2009

(51) Int. Cl.
*G06F 21/22* (2006.01)
(52) U.S. Cl.
USPC ............... 726/1; 726/16; 726/17; 726/21
(58) Field of Classification Search .......... 726/1, 4, 726/6; 706/45
See application file for complete search history.

(56) References Cited

U.S. PATENT DOCUMENTS

| | | | | |
|---|---|---|---|---|
| 6,189,101 | B1* | 2/2001 | Dusenbury, Jr. | 726/2 |
| 7,080,070 | B1* | 7/2006 | Gavarini | 705/26.8 |
| 7,302,488 | B2* | 11/2007 | Mathew et al. | 709/229 |
| 7,356,836 | B2* | 4/2008 | Beilinson et al. | 726/4 |
| 7,797,735 | B2* | 9/2010 | Beilinson et al. | 726/4 |
| 2002/0162031 | A1* | 10/2002 | Levin et al. | 713/202 |
| 2004/0019807 | A1* | 1/2004 | Freund | 713/201 |
| 2004/0088553 | A1* | 5/2004 | Levin et al. | 713/186 |
| 2004/0193912 | A1* | 9/2004 | Li et al. | 713/200 |
| 2006/0212925 | A1* | 9/2006 | Shull et al. | 726/1 |
| 2008/0196055 | A1* | 8/2008 | Sandoval et al. | 725/25 |
| 2009/0037355 | A1* | 2/2009 | Brave et al. | 706/45 |
| 2009/0282438 | A1* | 11/2009 | White | 725/44 |

OTHER PUBLICATIONS

Hoi Chan and Thomas Kwok, A Policy-based Management System with Automatic Policy Selection and Creation Capabilities by using a Singular Value Decomposition Technique, IEEE Computer Society, 2006.*
Shapira, Nathan et al—Psychiatric features of individuals with problematic internet use. Journal of Affective Disorders 57. 2000. p. 267-272.*
Li et al.—An Integrated Framework on Mining Logs Files for Computing System Management. ACM. 2005. http://users.cis.fiu.edu/~taoli/tenure/p776-li.pdf.*
Shirley et al.—TThe User is Not the Enemy—Fighting Malware by Tracking User Intentions. ACM 2008. http://www.cs.virginia.edu/~evans/pubs/nspw08/nspw27-shirley.pdf.*
Dudani—The distance-weighted k-nearest-neighbor rule. Ohio State University. 1975. http://ieeexplore.ieee.org/stamp/stamp.jsp?tp=&arnumber=5408784.*

\* cited by examiner

*Primary Examiner* — Kaveh Abrishamkar
*Assistant Examiner* — Ngoc D Nguyen
(74) *Attorney, Agent, or Firm* — ALG Intellectual Property, LLC

(57) ABSTRACT

A computer-implemented method for aiding parental-control-policy decisions may include identifying a computer resource. The computer resource may include any content subject to a parental-control-policy decision. The method may also include identifying a community usage repository. The community usage repository may include information relating to a plurality of children's usage of the computer resource. The method may further include analyzing the community usage repository to generate statistical data relating to the computer resource. The method may additionally include presenting the statistical data to a user. Various other methods, systems, and computer-readable media are also disclosed.

20 Claims, 6 Drawing Sheets

METHODS AND SYSTEMS FOR AIDING PARENTAL CONTROL POLICY DECISIONS

BACKGROUND

Children increasingly use computers in their everyday activities and may access a variety of content through computers. A parent or an organization may deem some content inappropriate for a child and may wish to prevent that child from accessing such content.

If a parent deems computer-accessible content inappropriate, the parent may use parental-control software to block a child from accessing the content's source (e.g., a computer application or a website). However, it may be difficult or time-intensive for a parent to ascertain whether a particular source should be blocked. The ever-growing number of available sources of content may multiply this burden, which may make the parent's task unduly difficult.

Parental-control software vendors may make content gatekeeping quicker and easier for parents by allowing them to automatically block content sources that the vendors determine are inappropriate. A parental-control-software vendor may use various methods to flag inappropriate content. For example, a parental-control software vendor may provide blacklists to which parents may subscribe. However, a blacklist may result in too many false negatives and false positives. For example, a blacklist may include a content source with valuable content that many parents would want open to their children. The same blacklist may fail to cover certain content sources that many parents would want to block.

In addition to or instead of blacklists, parental-control software may use heuristics (e.g., keyword detection) to guess whether content is inappropriate for a child. However, this method may suffer from the same fundamental defects as blacklists: too many false negatives and false positives. For example, a keyword that usually signals inappropriate content may be benign in some contexts, and some inappropriate content may contain no signaling keywords.

SUMMARY

The instant disclosure is directed to methods and systems for aiding parental-control-policy decisions by generating and presenting statistical data about a computer resource. In some embodiments, a community usage repository may collect information regarding children's usage of a computer resource. The community usage repository may additionally or alternatively collect other information about the computer resource. A usage-data-analysis module may analyze information in the community usage repository to create statistical data that may aid a parental-control-policy decision.

In some embodiments, one or more modules may collect information about a child's usage of a computer resource. For example, a usage-detection module may track a child's usage of a computer resource, and a usage-submission module may send information about the child's usage to a community usage repository. A usage-data-analysis module may analyze information in the community usage repository and generate statistical data about a computer resource, and the statistical data may be presented to a user.

In some embodiments, the community usage repository may allow access to data stored within it. For example, the usage-data-analysis module may request from the community usage repository all records of children within an age range attempting to access the computer resource. The usage-data-analysis module may then generate statistical data based on the requested records. Examples of statistical data may include the percentage of children within the age range who have accessed the computer resource, the percentage of children blocked from accessing the computer resource, and/or the percentage of children who reported that the computer resource should not be blocked. The instant disclosure also presents various other embodiments, alternatives, and examples for aiding parental-control-policy decisions.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
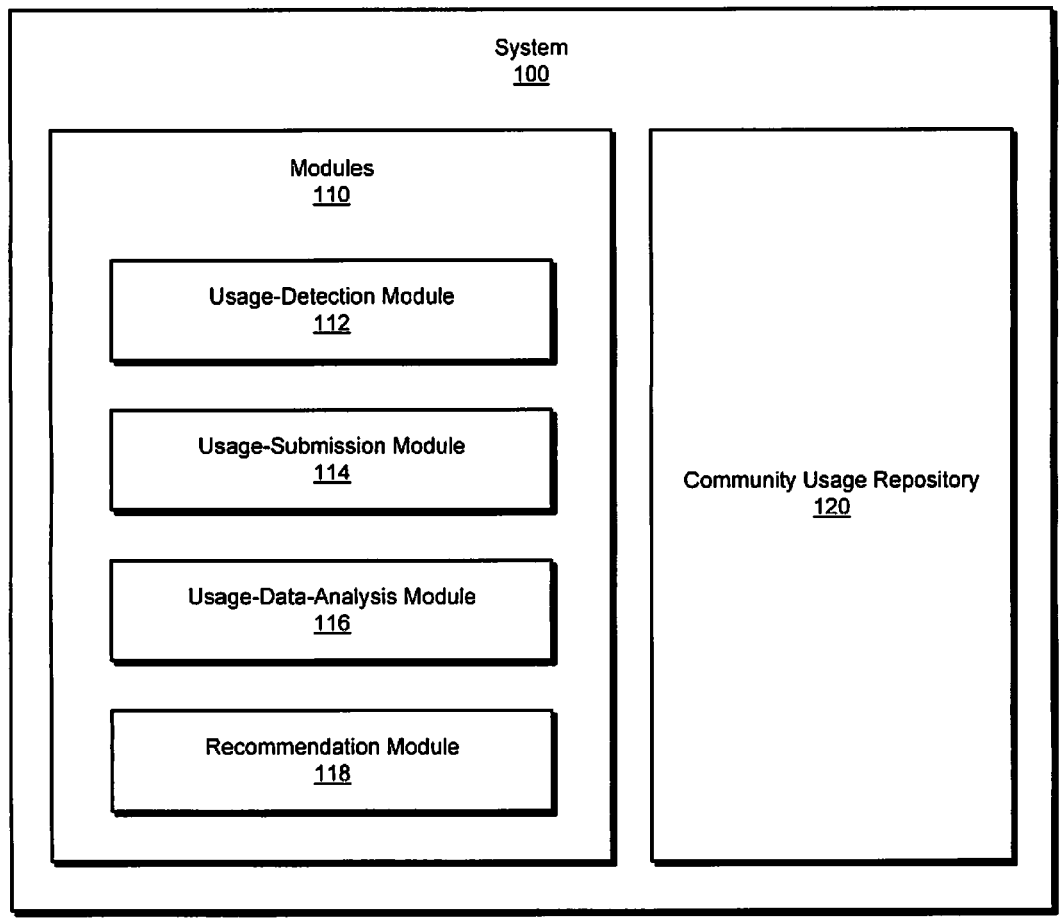
FIG. 1 is a block diagram of an exemplary computing system according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Embodiments of the present disclosure provide various methods and systems for aiding parental-control-policy decisions. For example, embodiments of the present disclosure may use one or more modules to generate statistical data relating to a computer resource and present the statistical data to a user. Embodiments of the present disclosure may provide various advantages over prior technologies. For example, methods described herein may allow for parental-control decisions that are both quick and an accurate reflection of a parent's wishes and judgment. Additionally, methods described herein may help to keep a parent or other user more informed about and involved with a child's exposure to computer-accessible content. These and other embodiments, features, and advantages will be more fully understood upon reading the following detailed description in conjunction with the accompanying drawings and claims.

FIG. 1 illustrates an exemplary system 100 for aiding parental-control-policy decisions. System 100 may include modules 110 and a community usage repository 120. Modules 110 may include a usage-detection module 112, a usage-submission module 114, a usage-data-analysis module 116, and a recommendation module 118. Usage-detection module 112 may be programmed to track a child's usage of a computing system. Usage-submission module 114 may be programmed to generate a child profile based on information obtained by usage-detection module 112. Usage-submission module 114 may also be programmed to submit the child profile to community usage repository 120. Usage-data-analysis module 116 may be programmed to analyze data in community usage repository 120 to generate statistical data relating to a computer resource, and recommendation module 118 may be programmed to present the statistical data to a user.

In certain embodiments, one or more of modules 110 in FIG. 1 may represent one or more software applications or programs that, when executed by a computing system, may cause the computing system to perform one or more steps disclosed herein. For example, as will be described in greater detail below, one or more of modules 110 may represent software modules configured to run on one or more computing devices, such as computing system 510 in FIG. 5 and/or portions of exemplary network architecture 600 in FIG. 6. One or more modules 110 in FIG. 1 may also represent all or portions of one or more special-purpose computers configured to perform one or more of the tasks associated with steps disclosed herein.

As previously noted, system 100 may include community usage repository 120. Community usage repository 120 may include information associated with children's usage of computer resources. Information associated with children's usage of computer resources may be provided to community usage repository in one or more child profiles. Community usage repository 120 may represent a portion of one or more computing devices. Community usage repository 120 may represent a portion of computing system 510 in FIG. 5 and/or portions of exemplary network architecture 600 in FIG. 6. Community usage repository 120 may include a database and/or any data structure capable of storing and/or organizing child profiles.

Usage-detection module 112, usage-submission module 114, usage-data-analysis module 116, recommendation module 118, and community usage repository 120 may be located on two or more computing subsystems. For example, usage-detection module 112 and usage-submission module 114 may be located on a first computing subsystem while usage-data-analysis module 116, recommendation module 118, and community usage repository 120 may be located on a second, remote computing subsystem. In other embodiments, usage-detection module 112, usage-submission module 114, and recommendation module 118 may be located on a first computing subsystem while usage-data-analysis module 116 and community usage repository 120 may be located on a second, remote computing system.

Figure 2:
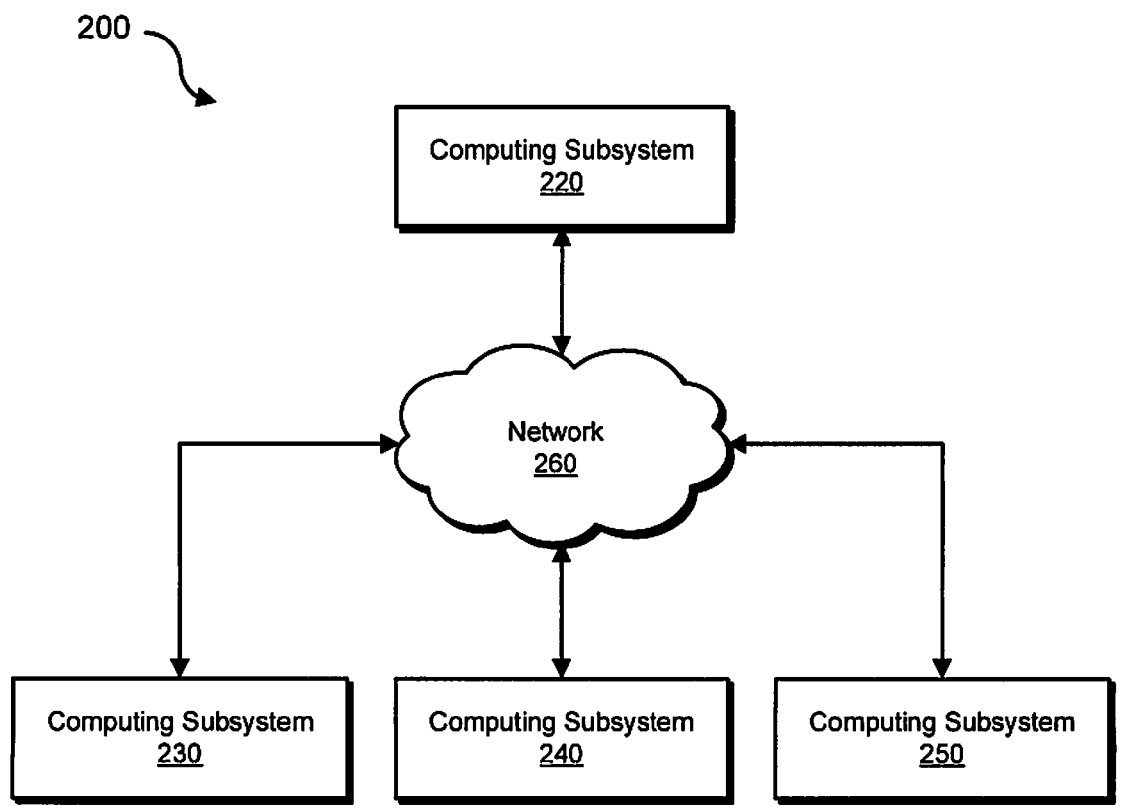
FIG. 2 is a block diagram of another exemplary computing system according to certain embodiments.

FIG. 2 is a block diagram of an exemplary system 200 for aiding parental-control-policy decisions. Exemplary system 200 may include a computing subsystem 220, a computing subsystem 230, a computing subsystem 240, a computing subsystem 250, and a network 260. Computing subsystems 220, 230, 240, and 250 may include or be implemented as hardware, computing instructions (e.g., software), or a combination thereof. For example, computing subsystem 220 may include a server (e.g., a security software server and/or a parental-control software server), and computing subsystems 230, 240, and 250 may include end-user computing devices. In some embodiments, one or more of computing subsystems 230, 240, and 250 may include a desktop computer, a laptop computer, a portable-computing device, a workstation, and/or any other suitable computing device.

Computing subsystems 230, 240, and/or 250 may include user systems which provide child data, usage data, and/or parental-control-policy data to computing subsystem 220. In turn, computing subsystem 220 may provide statistical data and/or recommendation data to computing subsystems 230, 240, and/or 250. In these or other embodiments, computing subsystem 220 may include usage-data-analysis module 116 and/or community usage repository subsystem 120. Computing subsystems 230, 240, and 250 may each include usage-detection module 112, usage-submission module 114, and/or recommendation module 118. In some embodiments, computing subsystem 220 may include recommendation module 118. In alternative embodiments, recommendation module 118 may be included in one or more of computing subsystems 230, 240, and 250.

Computing subsystems 220, 230, 240, and 250 may communicate over network 260. Network 260 generally represents any medium or architecture capable of facilitating communication or data transfer. Network 260 may include, without limitation, an intranet, a wide area network (WAN), a local area network (LAN), a personal area network (PAN), the Internet, power line communications (PLC), a cellular network (e.g., GSM network), or the like. Network 260 may facilitate communication or data transfer using wireless and/or wired connections.

Figure 3:
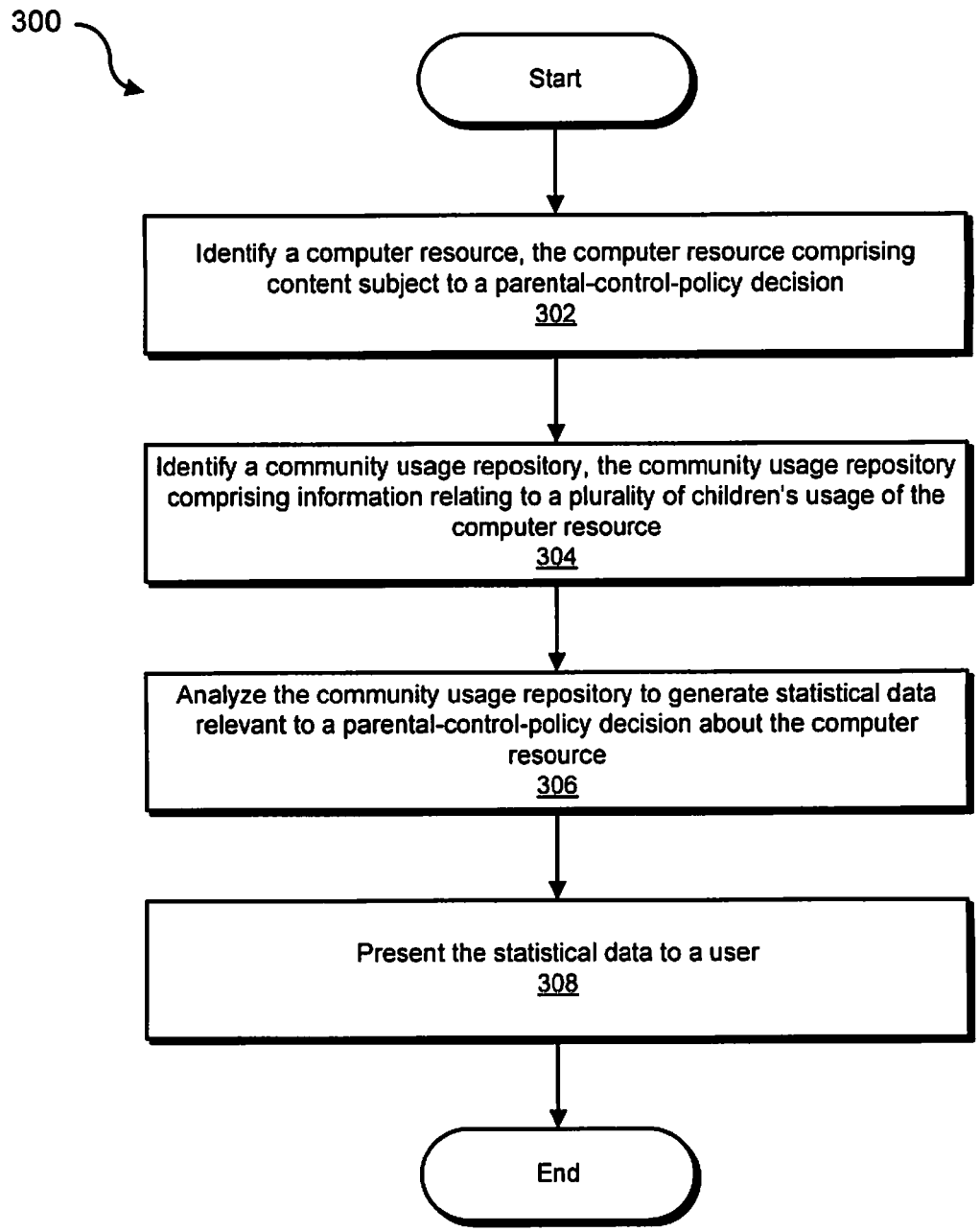
FIG. 3 is a flow diagram of a computer-implemented method for aiding parental-control-policy decisions.

FIG. 3 shows an exemplary method 300 for aiding parental-control-policy decisions. The steps shown in FIG. 3 may be performed by any suitable computer-executable code and/or computing system. In some embodiments, the steps shown in FIG. 3 may be performed by one or more of usage-data-analysis module 116 and/or recommendation module 118. For example, usage-data-analysis module 116 may identify a computer resource (step 302). Usage-data-analysis module 116 may identify the computer resource in a variety of contexts. In some embodiments, usage-data-analysis module 116 may identify the computer resource in response to a request to obtain information about the computer resource. Alternatively or additionally, usage-data-analysis module 116 may identify the computer resource when usage-submission module 114 submits information about a child's resource use to community usage repository 120.

As noted, usage-data-analysis module 116 may identify the computer resource in response to a request for information about the computer resource. For example, parental-control software installed on computing subsystem 230 may send the request for information about the computer resource to computing subsystem 220. The parental-control software may include and/or communicate with one or more of usage-detection module 112, usage-submission module 114, and recommendation module 118.

The parental-control software may send the request, or cause the request to be sent, in any of a number of contexts. In some embodiments, the parental-control software may keep a history of computer resources accessed by a child and send the request when a user (e.g., a parent) examines the child's access of the computer resource in the history. In other embodiments, a user may want to obtain information about a particular resource and may cause the parental-control software to request information about the resource.

In another case, the parental-control software may send the request when the parental-control software allows a user to make a parental-control-policy decision about a computer resource. A parental-control-policy decision may be any decision affecting a child's access to the computer resource (e.g., blocking the child's access to the resource). As a final example, the parental-control software may simply send the request when usage-detection module 112 detects an attempt to access the computer resource. Generally, the parental-control software may request more information about the computer resource in any context in order to aid the parental-control-policy decision.

In some embodiments, usage-data-analysis module 116 may identify the computer resource when usage-submission module 114 submits a child profile to community usage repository 120. For example, usage-submission module 114 may be located on computing subsystem 230, and community usage repository 120 may be located on computing subsystem 220. Usage-submission module 114 may access a network interface card of computing subsystem 230 to transmit the child profile to computing subsystem 220. The child profile may include information identifying the computer resource. A module on computing subsystem 220 may then receive the child profile. If the receiving module is usage-data-analysis module 116, then usage-data-analysis module 116 may identify the computer resource in the child profile. If the receiving module is not usage-data-analysis module 116, the receiving module may identify the computer resource in the child profile and relay the computer resource identification to usage-data-analysis module 116. Alternatively, usage-data-analysis module 116 may query community usage repository 120 for newly submitted computer resources and receive an identification of the computer resource in response.

As mentioned earlier, the child profile may include information about a child's usage of a computing system, including computer resources the child has accessed or attempted to access. For example, usage-detection module 112 may detect the child's attempt to access the computer resource on computing subsystem 230. Usage-submission module 114 may include this information, including information identifying the computer resource, in the child profile. Usage-submission module 114 may then submit the child profile to community usage repository 120 on computing subsystem 220. This may entail usage-submission-module 114 accessing a network-interface card on computing subsystem 230 to send the child profile across network 260 to computing subsystem 220. Usage-data-analysis module 116 may detect the child profile on arrival and identify the computer resource.

The child profile may include any information about the child, the computer resource, and/or a parental-control policy relating to the computer resource, as well as any other information directly or indirectly useful to aiding a parental-control-policy decision. Information about the child may be used, among other things, to target information to the user based on the child's demographic groups. Information about the computer resource may be used, among other things, to provide information about usage of the computer resource and to provide context to the user about the functionality, subject matter, and/or purpose of the computer resource. Information about the parental-control policy relating to the computer resource may be used, among other things, to provide information to the user about other users' parental-control-policy decisions with respect to the computer resource.

Information in the child profile relating to the child may include, for example, the child's age, sex, birthday, and/or age group. Usage-data-analysis module 116 may use the child's age or other characteristics to restrict analysis of usage data in community usage repository 120 to the child's age or other characteristic group.

Information in the child profile relating to the computer resource may include, for example, information identifying the computer resource, an indication of whether the child accessed the computer resource, a date and/or time that the child accessed the computer resource, and/or a duration of the child's access of the computer resource. Information identifying the computer resource may include a domain name for a website (such as MYSPACE.COM), or an application name or a file name for an application (such as AOL INSTANT MESSENGER or AIM.EXE). This information may uniquely identify the computer resource and the child's usage of the computer resource. Usage-data-analysis module 116 may also use information such as the duration of the child's access of the computer resource to identify usage patterns which recommendation module 118 may provide as context to the user. For example, if children who access a computer resource spend, on average, several hours in a week accessing the computer resource, recommendation module 118 may notify the user and flag the computer resource as potentially habit-forming.

Other information in the child profile relating to the computer resource may include characteristics of the computer resource. Characteristics of the computer resource may include whether the computer resource accesses a network, whether the computer resource retrieves data asynchronously (e.g., a website using AJAX), whether the computer resource links to third-party content, whether the computer resource contains an advertisement, whether the computer resource is a full-screen application, and/or a category of the computer resource (e.g., a game or a news website). Usage-data-analysis module 116 and recommendation module 118 may use the characteristics of the computer resource in a variety of ways. If the computer resource accesses a network, recommendation module 118 may notify the user and flag the possibility that the child could be exposed to content generated by strangers. If the computer resource retrieves data asynchronously, recommendation module 118 may notify the user and note that the resource may be more interactive, possibly indicating a game or real-time chat. If the computer resource links to third-party content or contains an advertisement, recommendation module 118 may notify the user and flag the possibility that while the primary content of the computer resource may be appropriate, the child may view or arrive at inappropriate content via the inclusion of a third party in the content of the computer resource. If the computer resource is a full-screen application, recommendation module 118 may notify the user and flag the application as more likely to be a game.

The computer resource may be any source of content that may be subject to a parental-control-policy decision (e.g., a computer application or a website). For example, AOL INSTANT MESSENGER (AIM.EXE), other WINDOWS executable files (.EXE), FACEBOOK.COM, MYSPACE.COM, DIGG.COM, and/or other websites may be subject to parental-control policy decisions.

Information about a parental-control policy relating to a computer resource may include, for example, whether a parental control blocked the child's access to the computer resource and/or whether the child reported that the computer resource was incorrectly blocked. Usage-data-analysis module 116 may aggregate this information from community usage repository 120, and recommendation module 118 may notify the user what percentage of users have blocked access to the computer resource and what percentage of children have reported that access should not be blocked.

Information about a parental-control policy relating to a computer resource may also include information about a parental-control-policy decision that led to the parental-control policy. For example, information about a parental-control policy relating to a computer resource may differentiate between a parent failing to block the computer resource and the parent deciding to allow access to the computer resource after reviewing the computer resource and/or statistical data relating to the computer resource.

The phrase "parental-control policies," as used herein, generally refers to policies and/or settings that control access to computing information and/or resources (e.g., the Internet and/or a computing system). Parental-control policies may include policies that restrict, limit, prohibit, or otherwise control activities of children. For example, parental-control policies may include policies that limit access to various types of objectionable content and/or content that may be inappropriate for children of a particular age. In some embodiments, a parental-control policy may set forth approved or prohibited websites. In certain embodiments, a parental-control policy may control a time period defining when a child may access data (e.g., a time limit on a child's Internet use). A parental-control policy may also control which applications a child may execute. In some embodiments, a parental-control policy may set forth file permissions for a child and/or may define access control for other computer resources.

Returning to FIG. 3, in addition to identifying the computer resource, usage-data-analysis module 116 may identify a community usage repository, such as community usage repository 120 (step 304). Community usage repository 120 may include information relating to a plurality of children's usage of the computer resource, as well as other information derived from child profiles. Community usage repository 120 may contain information based on child profiles it has received. For example, community usage repository 120 may be stored on computing subsystem 220 and may include child profiles submitted from computing subsystems 230, 240, and 250.

Usage-data-analysis module 116 may identify community usage repository 120 by identifying and/or accessing its storage location. For example, computing subsystem 220 may include a storage device, such as a hard disk drive. The hard disk drive may include community usage repository 120. Usage-data-analysis module 116 may identify community usage repository 120 by accessing or preparing to access the hard disk drive. Usage-data-analysis module 116 may access the hard disk drive directly or through other executable code such as database software.

Returning to FIG. 3, after identifying the computer resource and the community usage repository, usage-data-analysis module 116 may analyze the information stored in community usage repository 120 (step 306). Usage-data-analysis module 116 may then generate statistical data relevant to a parental-control-policy decision about the computer resource. For example, usage-data-analysis module 116 may access information from community usage repository 120. Usage-data-analysis module 116 may access information from community usage repository 120 in a variety of ways.

In some embodiments, usage-data-analysis module 116 access information from community usage repository 120 by querying community usage repository 120 for records relating to the computer resource. Additionally or alternatively, usage-data-analysis module 116 may further restrict the query by other factors, such as child age. For example, usage-data-analysis module 116 may query community usage repository 120 for all records of children accessing a computer resource for longer than an hour at a time, where the children are in an age group of 8 to 13 years.

In some alternative embodiments, usage-data-analysis module 116 may access information from community usage repository 120 by requesting all of the records relating to the computer resource. Usage-data-analysis module 116 may then filter the records by other factors. For example, usage-data-analysis module 116 may filter for records of children within an age range accessing the computer resource. In another example, usage-data-analysis module 116 may filter for records of children whose access to the computer resource was blocked. In an additional example, usage-data-analysis module 116 may filter for records of children who reported that the computer resource was incorrectly blocked. Once usage-data-analysis module 116 has accessed the information from community repository 120, usage-data-analysis module 116 may generate statistical data based on the information. For instance, usage-data-analysis module 116 may calculate the percentage of children within an age range who access the computer resource. Usage-data-analysis module 116 may also calculate the percentage of children whose access to the computer resource is blocked, and/or the percentage of children who reported that the computer resource should not be blocked.

Statistical data may be any data based on the community usage repository. In some embodiments, the statistical data may indicate trends of children's usage of the computer resource or of parental-control policies relating to the computer resource. In some embodiments, the statistical data may indicate characteristics of the computer resource. For example, the statistical data may reveal how many times the computer resource was identified as a full-screen application.

In some embodiments, the statistical data may indicate that the computer resource has a characteristic if it has been identified with that characteristic a certain number of times. For instance, if a website has been categorized as a news website five times or more, the usage-data-analysis module 116 may determine that the website is a news website. In some embodiments, a single instance may suffice to attribute a characteristic to the computer resource. In other embodiments, an absolute percentage of child profiles or a marginal percentage of child profiles assigning the characteristic to the computer resource may be required to attribute the characteristic to the computer resource. For example, usage-data-analysis module 116 may require an absolute percentage, such as 51 percent, of all child profiles that include the computer resource to attribute the characteristic to the computer resource. Alternatively, usage-data-analysis module 116 may require a marginal percentage. For example, if 40 percent of the child profiles designate the computer resource as a news source, 35 percent designate the computer resource as a game, and 25 percent fail to designate the computer resource, the marginal percentage of child profiles designating the computer resource as a news source over those designating the computer resource as a game may be 5 percent. If the required marginal percentage is 10 percent, usage-data-analysis module 116 may not designate the computer resource as a news source.

In some embodiments, the statistical data may indicate trends of parental-control-policy decisions relating to the computer resource. For example, the statistical data may show the percentage of children whose parents have blocked access to the computer resource. In another example, the statistical data on parental-control-policy decisions may indicate the percentage of children within an age group whose parents have allowed access to the computer resource. For instance, 60 percent of all children's access to a computer resource may have been blocked, but parents may have allowed access to the computer resource for 90 percent of all children between the ages of 15 and 17. The statistical data may include both the universal trend and the narrower age-based trend.

Returning to FIG. 3, after usage-data-analysis module 116 analyzes the community usage repository and generates the statistical data, recommendation module 118 may present the statistical data to a user (step 308). Recommendation module 118 may present the statistical data to the user by any suitable mechanism. For example, usage-data-analysis module 116 may send the statistical data across network 260 from computing subsystem 220 to recommendation module 118 on computing system 230. Recommendation module 118 may then present the statistical data to the user. In some embodiments, recommendation module 118 may present all of the statistical data to the user. In other embodiments, recommendation module 118 may present only selected portions of the statistical data and may present other portions of the statistical data upon request. For example, recommendation module 118 may always present the number of children using the computer resource, but may only present information concerning whether the computer resource contains an advertisement upon further inquiry.

According to various embodiments, recommendation module 118 may determine, based on the child profile and the statistical data, a probability that the computer resource is appropriate for the child. For example, recommendation module 118 may perform a recommendation algorithm based on the community usage repository. The recommendation algorithm may be any suitable algorithm, such as k-nearest neighbor or cosine similarity. For instance, if recommendation module performs the k-nearest neighbor algorithm, it may compute the distance between previous decisions of the user and previous decisions of other users on whether to block or allow a child's access to each computer resource. The recommendation module may then determine which group of users most closely matches the user's decision pattern and make separate recommendations based on that group of users. Similarly, if recommendation module 118 uses a cosine similarity algorithm, recommendation module 118 may determine the similarity between the parental-control-policy decisions of the user and any other user. Recommendation module 118 may then use the computed similarity to determine the relevance to the user of any other user's parental-control-policy decision.

According to some embodiments, recommendation module 118 may recommend a parental-control policy based on the statistical data. For example, if recommendation module 118 determines the probability that the computer resource is appropriate for the child is less than 50 percent, recommendation module 118 may recommend that the user block the child's access to the computer resource. In an additional example, if the percentage of children whose access to the computer resource is blocked is greater than the percentage of children who are allowed to access the computer resource, recommendation module 118 may recommend that the user block the computer resource.

According to certain embodiments, recommendation module 118 may receive a parental-control-policy decision from the user. For example, a parent may respond to a recommendation from recommendation module 118 by indicating a parental-control-policy decision. The parental-control-policy decision may be received through any suitable input device. In other embodiments, recommendation module 118 may identify a parental-control-policy decision by tracking changes to parental-control policies. Recommendation module 118 may then submit the parental-control-policy decision to community usage repository 120.

Figure 4:
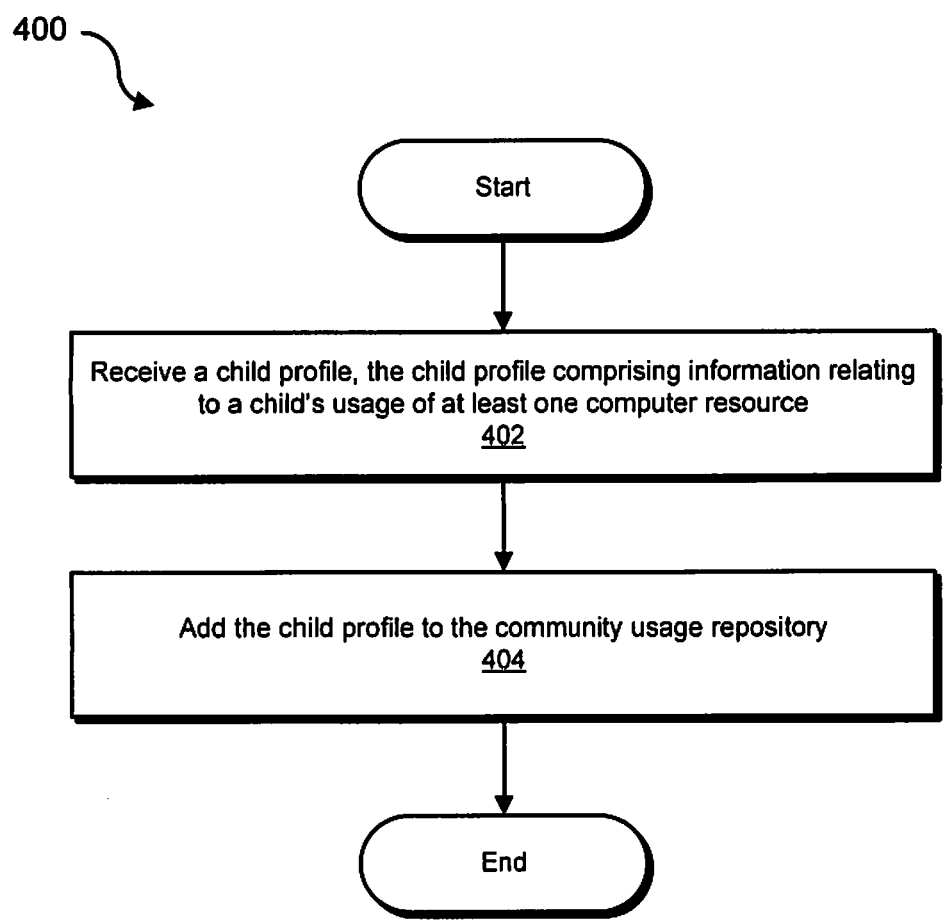
FIG. 4 is a flow diagram of a computer-implemented method for aiding parental-control-policy decisions according to certain embodiments.

FIG. 4 shows an exemplary method 400 for aiding parental-control-policy decisions. The steps shown in FIG. 4 may be performed by community usage repository 120 and/or any other computer-executable code. First, a computing subsystem, such as computing subsystem 220, may receive a child profile (step 402). The child profile may include information relating to a child's usage of at least one computer resource. Computing subsystem 220 may receive the child profile by any of the mechanisms described for step 302 of FIG. 3 or by any other suitable mechanism. After the child profile is received, the child profile may be added to the community usage repository (step 404). The child profile may be added to the community usage repository by any of the mechanisms described earlier or by any other suitable mechanism. For example, the child profile may be added to the community usage repository by parsing the child profile into separate data elements, accessing a database, and inserting the data elements into the database.

Figure 5:
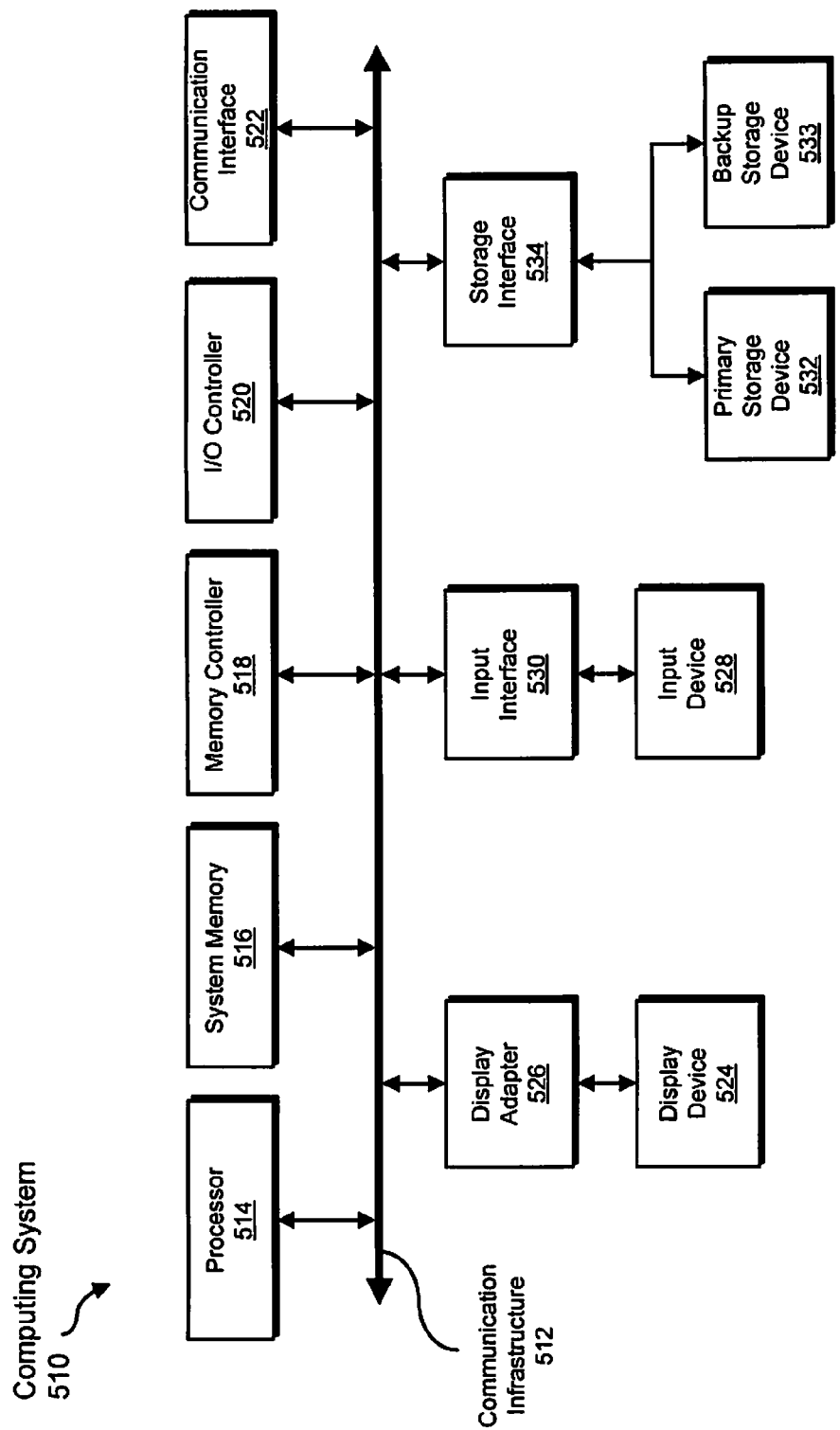
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and system memory 516.

Processor 514 generally represents any type or form of processing unit capable of processing data or interpreting and executing instructions. In certain embodiments, Processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, analyzing, presenting, receiving, adding, determining, recommending, submitting, and/or implementing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments, memory controller 518 may control communication between processor 514, system memory 516, and I/O controller 520 via communication infrastructure 512. In certain embodiments, memory controller 518 may perform and/or is a means for performing, either alone or in combination with other elements, one or more of the steps or features described and/or illustrated herein, such as identifying, analyzing, presenting, receiving, adding, determining, recommending, submitting, and/or implementing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for identifying, analyzing, presenting, receiving, adding, determining, recommending, submitting, and/or implementing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments, communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the internet. Communication interface 522 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, analyzing, presenting, receiving, adding, determining, recommending, submitting, and/or implementing steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, analyzing, presenting, receiving, adding, determining, recommending, submitting, and/or implementing steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Storage devices 532 and 533 may also be used, for example, to perform and/or be a means for performing, either alone or in combination with other elements, one or more of the identifying, analyzing, presenting, receiving, adding, determining, recommending, submitting, and/or implementing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
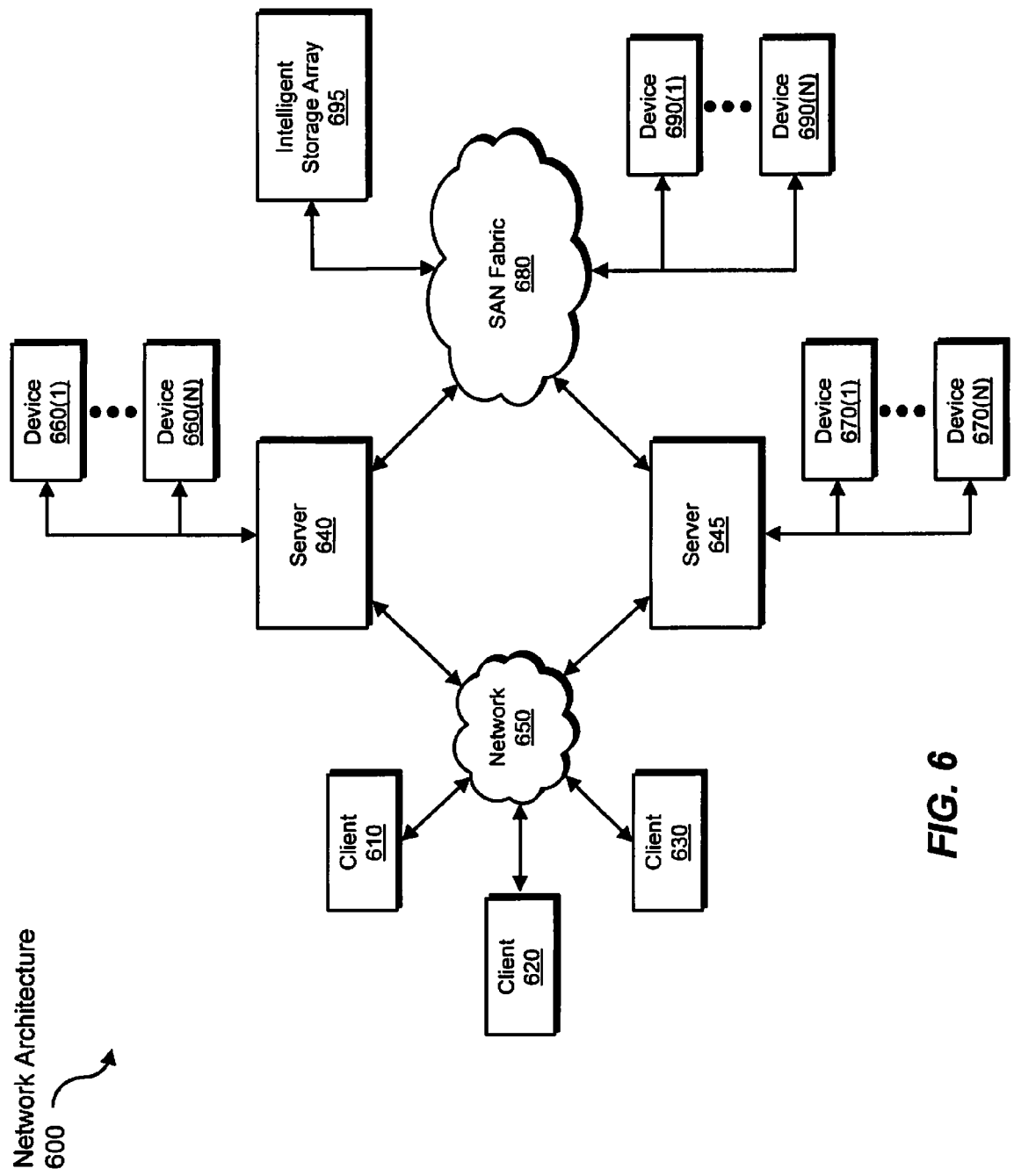
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5 and/or computing subsystems 230, 240, and 250 in FIG. 2. Similarly, servers 640 and 645 generally represent computing devices or systems, such as application servers or database servers, configured to provide various database services and/or to run certain software applications. One or more of servers 640 and 645 may represent computing subsystem 220 in FIG. 2. Network 650 generally represents any telecommunication or computer network; including, for example, an intranet, a wide area network (WAN), a local area network (LAN), a personal area network (PAN), or the internet. For example, network 650 may represent network 260 in FIG. 2.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the internet) for exchanging data, the embodiments described and/or illustrated herein are not limited to the internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and/or distributed to client systems 610, 620, and 630 over network 650. Accordingly, network architecture 600 may perform and/or be a means for performing, either alone or in combination with other elements, one or more of the identifying, analyzing, presenting, receiving, adding, determining, recommending, submitting, and/or implementing steps disclosed herein. Network architecture 600 may also be used to perform and/or be a means for performing other steps and features set forth in the instant disclosure.

As detailed above, computing system 510 and/or one or more of the components of network architecture 600 may perform and/or be a means for performing, either alone or in combination with other elements, one or more steps of the exemplary methods described and/or illustrated herein. For example, a computer system (e.g., computing system 510 and/or one or more of the components of network architecture 600) may perform a computer-implemented method for aiding parental-control-policy decisions. The computer system may identify a computer resource. The computer resource may comprise content subject to a parental-control-policy decision. The computer system may further include a community usage repository. The community usage repository may comprise information relating to a plurality of children's usage of the computer resource. The computer system may then analyze the information stored in the community usage repository to generate statistical data relevant to a parental-control-policy decision about the computer resource. The computer system may further present the statistical data to a user.

In certain embodiments, the computer system may receive a child profile. The child profile may comprise information relating to a child's usage of at least one computer resource. The computer system may then add the child profile to the community usage repository.

According to some embodiments, the child profile may comprise at least one of: an age of the child, information identifying the computer resource, an indication of whether the child accessed the computer resource, a date and time that the child accessed the computer resource, a duration of the child's usage of the computer resource, an indication of whether a parental control blocked the child's access to the computer resource, an indication of whether the child reported that the computer resource was incorrectly blocked, and a resource profile of the computer resource.

According to some embodiments, the resource profile may comprise at least one of: an indication of whether the computer resource accesses a network, an indication of whether the computer resource retrieves data asynchronously, an indication of whether the computer resource contains a link to third-party content, an indication of whether the computer resource contains an advertisement, an indication of whether the computer resource is a full-screen application, and a category of the computer resource.

According to some embodiments, the statistical data may be based on at least one element of the child profile. According to additional embodiments, the computer system may further determine, based on the child profile and the statistical data, a probability that the computer resource is appropriate for the child. In some embodiments, the computer resource may comprise at least one of a computer application or a website.

In some embodiments, the statistical data may comprise at least one of child usage statistics of the computer resource and parental blocking statistics of the computer resource. According to certain embodiments, the computer system may further recommend a parental-control policy based on the statistical data. According to various further embodiments, the computer system may implement a parental-control policy based on input from the user.

According to some embodiments, the computer system may identify the parental-control-policy decision based on input from the user. The computer system may then submit the parental-control-policy decision to the community usage repository. In some embodiments, identifying the computer resource may comprise receiving a request for statistical data relating to the computer resource.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for aiding parental-control-policy decisions, the computer-implemented method comprising:
   receiving a request for information about whether a computer resource on a local computing system is appropriate for a child, the computer resource comprising content subject to a parental-control-policy decision;
   identifying a community usage repository stored on a remote computing system that is remote from the local computing system, the community usage repository comprising information relating to a plurality of children's usage of the computer resource;
   analyzing, by a processor, the information stored in the community usage repository to generate statistical data relevant to the parental-control-policy decision about the computer resource by:
      determining one or more similarities between one or more previous parental-control-policy decisions of a parent of the child and one or more parental-control-policy decisions of additional parents whose parental-control-policy decisions are stored in the community usage repository;
      using the one or more similarities to determine relevance, to the parent, of the one or more parental-control-policy decisions of the additional parents;
   determining, based on the statistical data, whether to recommend to the parent that the computer resource is appropriate for the child;
   providing a recommendation indicating whether the computer resource is appropriate for the child.

2. The computer-implemented method of claim 1, wherein using the one or more similarities to determine relevance, to the parent, of the one or more decisions of the additional parents comprises:
   computing one or more distances between the one or more previous parental-control-policy decisions of the parent and the one or more parental-control-policy decisions of the additional parents;
   using the one or more distances to identify a subset of the additional parents whose decision patterns are closest to decision patterns of the parent, where the determination of whether to recommend that the computer resource is appropriate for the child is based on parental-control-policy decisions of the subset of the additional parents.

3. The computer-implemented method of claim 1, wherein:
the community usage repository comprises profiles of a plurality of additional children;
analyzing the information stored in the community usage repository comprises analyzing the profiles of the plurality of additional children;
the determination of whether to recommend to the parent that the computer resource is appropriate for the child is based on the analysis of the profiles of the plurality of additional children.

4. The computer-implemented method of claim 1, wherein receiving the request for information about the computer resource comprises receiving information about a child indicative of at least one demographic group of the child.

5. The computer-implemented method of claim 4, wherein determining, based on the statistical data, whether to recommend to the parent that the computer resource is appropriate for the child comprises determining, based on the information from the community usage repository about other children in the demographic group of the child indicative of whether parental-control policies blocked the other children's access to the computer resource, a probability that the computer resource is appropriate for the child.

6. The computer-implemented method of claim 1, wherein providing the recommendation indicating whether the computer resource is appropriate for the child comprises providing information to the parent about the additional parental-control-policy decisions with respect to the computer resource.

7. The computer-implemented method of claim 1, wherein the statistical data comprises a percentage of parents that have blocked their children's access to the computer resource.

8. The computer-implemented method of claim 1, wherein providing the recommendation comprises recommending, based on the statistical data, a parental-control policy.

9. The computer-implemented method of claim 8, further comprising:
after recommending the parental-control policy, receiving a parental-control-policy decision from the parent;
submitting the parental-control-policy decision to the community usage repository.

10. The computer-implemented method of claim 1, wherein the statistical data comprises a percentage of children that have reported access should not be blocked.

11. The computer-implemented method of claim 1, wherein analyzing the information stored in the community usage repository comprises filtering, within an age range, for records of children who have attempted to access the computer resource.

12. A system for aiding parental-control-policy decisions, the system comprising:
a usage-detection module installed on a first computing subsystem and programmed to track a child's usage of a computing system;
a usage-submission module installed on the first computing subsystem and programmed to:
generate a child profile based on the child's usage and other data relevant to determining appropriate parental-control policies;
submit the child profile to a second computing subsystem;
a community usage repository on the second computing subsystem configured to store the child profile;
a usage-data-analysis module installed on the second computing subsystem and programmed to analyze information stored in the community usage repository to generate statistical data relating to a computer resource by:
determining one or more similarities between one or more previous parental-control-policy decisions of a parent of the child and one or more parental-control-policy decisions of additional parents whose parental-control-policy decisions are stored in the community usage repository;
using the one or more similarities to determine relevance, to the parent, of the one or more parental-control-policy decisions of the additional parents;
a recommendation module programmed to present the statistical data to the parent;
one or more hardware processors configured to execute the usage-detection module, the usage-submission module, the usage-data-analysis module, and the recommendation module.

13. The system of claim 12, wherein the child profile comprises:
an age of the child;
information identifying the computer resource;
an indication of whether the child is allowed to access the computer resource.

14. The system of claim 13, wherein the recommendation module is programmed to notify the parent of a percentage of users who have blocked access to the computer resource and a percentage of children who have reported that access should not be blocked.

15. The system of claim 13, wherein the recommendation module is further programmed to determine, based on the child profile and the statistical data, a probability that the computer resource is appropriate for the child.

16. The system of claim 12, wherein the statistical data is presented by providing a recommendation to the parent indicating whether the computer resource is appropriate for the child.

17. The system of claim 12, wherein the usage-data-analysis module is programmed to use a characteristic of the child from the child profile to restrict analysis of the information in the community usage repository to information associated with other children who share the characteristic of the child.

18. The system of claim 12, wherein the recommendation module is further programmed to recommend, based on the statistical data, a parental-control policy.

19. The system of claim 12, wherein:
the usage-data-analysis module is programmed to analyze the information stored in the community usage repository to generate the statistical data relating to the computer resource by identifying a length of time that children spend using the computer resource during a period of time;
the recommendation module is programmed to, based on the length of time that children spend using the computer resource, notify the parent that the computer resource is potentially habit-forming.

20. A non-transitory computer-readable medium comprising one or more computer-executable instructions that, when executed by a computing device, cause the computing device to:
identify a computer resource on a local computing system, the computer resource comprising content subject to a parental-control-policy decision;
identify a community usage repository on a remote computing system, the community usage repository comprising information relating to a plurality of children's usage of the computer resource;

analyze the information stored in the community usage repository to generate statistical data relating to the computer resource by:
   determining one or more similarities between one or more previous parental-control-policy decisions of a parent of a child and one or more parental-control-policy decisions of additional parents whose parental-control-policy decisions are stored in the community usage repository;
   using the one or more similarities to determine relevance, to the parent, of the one or more parental-control-policy decisions of the additional parents;
present the statistical data to the parent.

* * * * *